Patented July 28, 1942

UNITED STATES PATENT OFFICE 2,291,202

CLEANING CUPREOUS ARTICLES

William H. Bassett, Jr., Scarsdale, and Clermont J. Snyder and Willis G. MacLelland, Hastings on Hudson, N. Y., assignors to Anaconda Wire and Cable Company, a corporation of Delaware No Drawing. Application July 23, 1941, Serial No. 403,706

19 Claims. (Cl. 148—8)

This invention relates to the cleaning of cupreous articles and has for its object the provision of an improved method of cleaning such articles. The invention is particularly applicable to the removal of scale and loose metallic particles from cupreous articles such, for example, as hot rolled copper and copper alloy rods, wirebars, and the like. This application is a continuation-in-part of our copending application Serial No. 326,428, filed March 28, 1940.

Hot rolled copper rods are covered with an oxide scale of variable composition, depending largely upon rolling conditions. The scale is made up of a mixture of cuprous, cupric and perhaps less common oxides of copper, with the cuprous (red) oxide usually predominating due to the presence of metallic copper. The cupric (black) oxide is mostly present as a skin on the outside of the scale. Before hot rolled copper rods can be used for wire drawing, or similar fabricating operations, the scale should be completely removed.

Various expedients have heretofore been used or proposed for removing scale from hot rolled copper rods. Dilute sulphuric acid solution readily dissolves the black oxide, but only slowly attacks the red oxide, and leaves harmful deposits of copper powder and undecomposed scale on the rods. The red oxide can be dissolved in solutions of strong oxidizing agents such as nitric acid, acid bichromate, manganese dioxide, etc., but these solutions are expensive and short-lived. Heating and quenching will remove scale from cupreous and other non-ferrous metal articles, the sudden change in temperature together with the steam formed at the surface of the hot metal being sufficient to shatter the scale and break it loose. This method of scaling, however, usually leaves the surface of the metal badly discolored with a thin film of suboxide and patches of black and red scale, and further cleaning is generally required.

In the course of an exhaustive investigation, we have discovered that while heating to a dull red heat and quenching will occasionally remove the scale from hot rolled copper bars in a satisfactory manner, the vast majority of bars subjected to such treatment are not satisfactorily cleaned. We have further discovered that the scale readily and completely removed by heating and quenching is largely made up of the black oxide, while the scale difficultly and incompletely removed by heating and quenching is largely made up of the red oxide. With these discoveries in mind, we have investigated the possibilities of changing the nature of the scale, and have discovered that by treating the rods in a way that apparently changes the composition of the scale, the treated scale peels off completely and leaves the rod clean and bright when it is heated to a dull red heat and quenched.

Our present invention is based on the foregoing discoveries, and involves treating the cupreous article with an aqueous solution containing chloride ions. Advantageously the chloride ions (especially if furnished by an alkali metal chloride) are employed in the solution in conjunction with ions of a heavy metal or sulphate ions or both. A water-soluble chloride of the heavy metals may be used alone in making up the solution. Alternatively, the solution may be made up of a water-soluble chloride (or even a chlorate) of the alkaline metals (i. e. alkali-metals including ammonia and the alkaline-earth metals) and a water-soluble sulphate of the heavy metals.

In practicing the invention, excellent results are attained by treating the cupreous article (e. g. hot rolled copper rod) with a solution of sodium chloride (e. g. rock salt) and copper sulphate (e. g. bluestone). Excellent results also are attained by treating the article with a very dilute solution of hydrochloric acid, or with a solution of copper chloride, or with a solution of ammonium chloride, or with a solution of copper sulphate and sodium chloride made slightly alkaline with ammonia. Other chloride solutions also may be employed with excellent results. The treatment is conveniently carried out by immersing the article in the solution for a sufficient period of time to effect the contemplated change in the nature of the scale. The thickness of the scale, and the saline concentrations and temperature of the solution, to some extent determine the effectiveness of the treatment. We have obtained excellent results by immersing the cupreous article for about 10 seconds to 5 minutes in a solution containing about 5% of sodium chloride and about 10% of copper sulphate maintained at a temperature of about 110° F. (65° C). This treatment apparently brings about a change in the composition of the scale and causes it to peel off completely and leave the article clean and bright when it is heated to a dull red heat and quenched.

The length of time of the wet treatment and the saline concentrations of the solution are not particularly critical. It appears that the chloride ion is the active chemical ingredient in the solution and attacks the cuprous oxide of the scale, during either the immersion stage or the subsequent heating stage, forming a complex chloride or oxychloride. The latter being somewhat unstable apparently breaks down during heating of the article and forms cupric chloride and oxide and finally all cupric oxide, giving off a small amount of yellow fume and a slight smell of chlorine. The relative thick coating of oxides left on the article peels off easily and completely when the article is quenched from a moderate temperature such as 600–675° C.

Following the wet treatment, the cupreous article, after removing excess solution, is subjected to the heat treatment. The latter may be carried out in any appropriate type of furnace. We have obtained excellent results with an electric muffle furnace. The heat treatment may advantageously be carried out in a continuous manner in a convection type furnace with track through the top of the furnace so that the articles to be heated can be hung on hooks and run through the furnace in a predetermined period of time. With a furnace temperature of 1200 to 1250° F. (650–675° C.), a heat treatment of 30 minutes, more or less, usually gives satisfactory results.

Quenching may be carried out in any desired manner. Thus, the article after the heat treatment may be quenched in air (either still air or an air blast), in oil, or in water. Quenching in any of these media causes the scale to break completely free from the underlying metal. Excellent results have been obtained by quenching in a tank of circulating water with handling equipment so that the hot articles can be removed from the furnace and immersed in the tank in less than 10 seconds. We have found that if water is used for quenching, it may advantageously be slightly saline; Hudson River water in the neighborhood of Hastings-on-Hudson, N. Y., giving excellent results. The saline content of this river water varies approximately from 2589 p. p. m. (at low tide) to 3848 p. p. m. (high tide), but this variation is of no significance in practice.

In our specific embodiment of our invention for cleaning hot rolled copper rods, the rods are immersed for 5 minutes in a solution of 5% rock salt and 10% bluestone at a temperature of about 110° F. Hudson River water (hereinbefore mentioned) makes an excellent solvent for the salt and bluestone (or other ingredients of the solution). Excess solution advantageously is removed by a rinse or dip in river water. The wet rods enter one end of the heating furnace and the hot rods exit at the other end, and in the furnace the rods are heated for 30 minutes at a temperature of 1200°–1250° F. The hot rods are immediately quenched in river water, the scale readily and completely peels off the rods, and a by-product of clean copper scale collects on the bottom of the quenching tank and is periodically removed. Such loose pieces of scale as adhere to the rods may be washed off by means of a hose. Where the cleaned rods are to be drawn into wire, they may be subjected to the present customary cleaning operations, such, for example, as immersion in an acid pickle solution, hot argol dip, etc., but such extra treatment is not usually necessary.

The duration of the wet treatment determines to some extent the percentage loss of weight due to the scaling operation. A five-minute dip in a solution containing 5% sodium chloride and 10% copper sulphate, followed by a rinse, usually produces a weight loss of about 1.5%. From tests we have conducted, it appears that at least 1% (by weight) should be removed from the surface of hot rolled copper rods in order to properly clean them. When treated in accordance with the preferred practice of the invention, the scale-free surface will be clean and bright with no discoloration.

The time of immersion of the rods in the solution may be varied over wide limits. We have obtained excellent scale removal from rods that have been immersed in the solution (10% copper sulphate and 5% sodium chloride) for only 10 seconds. When the immersion is for such a short period of time it is preferable not to wash or rinse the rods upon removal from the solution, but merely to allow excess solution to drain from them. In general, we have found that if the period of immersion is very short, it is better not to wash or rinse the rods or other articles, but if a long (e. g. 5 minute) period of immersion is employed, washing or rinsing ordinarily is desirable to avoid excess loss of copper in the scale. It is also best, generally speaking, not to rinse the rods, but merely to allow them to drain, if the treating solution contains no heavy metal or sulphate ions (e. g. if the treating solution contains only ammonium chloride, calcium chloride, hydrochloric acid, or other non-heavy metal chloride) or if the treating solution contains any free alkali (e. g. ammonium hydroxide).

The saline concentrations of the solution are generally not particularly critical. For example, with the mixture of sodium chloride and copper sulphate, the solution may contain these salts from about 1% by weight up to their maximum solubility in water. In general, however, the lower the concentration of the salts in the solution, the longer is the time required for the wet treatment, and the life of the solution is correspondingly shorter. The following saline concentrations have given satisfactory results in the practice of the invention, and are given merely by way of example:

5% sodium chloride and 10% copper sulphate
10% sodium chloride and 10% copper sulphate
1% sodium chloride and 10% copper sulphate
10% sodium chloride and 1% copper sulphate
10% sodium chloride and 10% ferric sulphate
10% sodium chloride and 10% nickel sulphate
10% sodium chloride and 10% ammonium sulphate
10% sodium chlorate and 10% copper sulphate
10% calcium chloride and 10% copper sulphate
10% ammonium chloride and 10% copper sulphate
10% sodium chloride and 2% copper sulphate
10% sodium chloride and 10% zinc sulphate
10% zinc chloride and 10% copper sulphate
5% ferric chloride and 10% copper sulphate
10% zinc chloride
10% cuprous chloride
10% cupric chloride
5% ferric chloride
10% calcium chloride
10% ammonium chloride
Dilute hydrochloric acid (5 c. c. of 35% HCl per liter of water)
5% sodium chloride, 10% copper sulphate, and 3.5 c. c. of 35% HCl per liter
5% sodium chloride, 10% copper sulphate, and 25 c. c. of glacial acetic acid per liter
5% sodium chloride, 10% copper sulphate, and 90 c. c. of ammonium hydroxide per liter
10% copper sulphate and 5 c. c. of 35% HCl per liter
10% sodium chloride and 10 c. c. of 35% HCl per liter
5% potassium chloride and 5 c. c. of 35% HCl per liter
10% sodium chloride and 5 c. c. of concentrated $H_2SO_4$ per liter The chemical requirements of the wet treatment seem to be a solution which will attack the scale on the cupreous article to form a suitable amount of complex chloride or oxychloride in the scale to cause the desired subsequent reaction when the article is heated. The presence in the solution of a heavy metal salt is advantageous in some cases (especially if the chloride is supplied in the form of an alkali metal chloride). In conjunction with sodium chloride, ammonium sulphate functions like a heavy metal salt, probably due to the corrosiveness of ammonium compounds on copper.

If the solution is distinctly acid and the time of immersion is long (about 5 minutes, for example) the scaled cupreous article may be somewhat discolored, but such discoloration does not impair the quality of the scaled rods for drawing into wire, and the presence of free acid in the solution does not appreciably change its scaling properties, but will generally impart a colored surface to the scaled article. For example, a solution made up of hydrochloric and sulphuric acids gives good scaling but leaves a discolored surface on rods that have been immersed in the solution for a long period of time. On the other hand, we have obtained excellent scaling using merely a dilute solution of hydrochloric acid (5 c. c. of commercial 35% hydrochloric acid to one liter of water), the rods being immersed in this solution for ten seconds and then subjected without rinsing to the heat treatment. The scale loss from rods so treated was 1.4%, and the scaled rods were clean and bright without discoloration. Excellent scaling without discoloration has also been obtained by immersing the rods for a short period of time in a solution of 10% copper sulphate and 5% sodium chloride made alkaline with ammonium hydroxide, and then subjecting the rods to the heat treatment. In general, the pH of the solution is not critical insofar as securing satisfactory scale removal and the production of clean rods ready for wire-drawing is concerned. Discoloration of the rods generally may be avoided, without significantly impairing the effectiveness with which scale is removed, by shortening the time of the wet treatment.

In the heat treatment, the article advantageously is heated to from 600 to 675° C. (1110-1250° F.), which temperature we have herein referred to as a dull red heat. In our practice of the invention, we preferably employ a temperature of about 660-675° C. The temperature should, in any case, be sufficiently high to complete the contemplated change in composition of the scale and to effect shattering and loosening of the scale due to the sudden change in temperature upon quenching. Both higher and lower temperatures than those stated may be employed successfully in the attainment of this result.

As hereinbefore stated the invention is particularly applicable to the cleaning of hot rolled copper rods. In the wire industry, such rods are usually of relatively long lengths and small-size cross sections and are customarily coiled for handling. By the method of the invention, scale is removed from such so-called black rods and the rods are transformed into cleaned rods ready for wire drawing. It is of course understood that the invention is not limited to the treatment of copper rods, but may be used with equal effectiveness for removing scale from other cupreous articles such as wirebars, extended shapes, castings, etc.

We claim:
1. The method of removing scale from cupreous articles which comprises treating the article with an aqueous solution containing chloride ions, heating the so-treated article to a dull red heat, and quenching the heated article.

2. The method of removing scale from cupreous articles which comprises immersing the article in an aqueous solution containing chloride ions and sulphate ions, heating the so-treated article to a dull red heat, and quenching the heated article.

3. The method of removing scale from cupreous articles which comprises treating the article with an aqueous solution containing chloride ions and ions of a heavy metal, heating the so-treated article to a dull red heat, and quenching the heated article.

4. The method of removing scale from cupreous articles which comprises treating the article with an aqueous solution containing chloride and sulphate ions and ions of a heavy metal, heating the so-treated article to a dull red heat, and quenching the heated article.

5. The method of removing scale from cupreous articles which comprises immersing the articles in an aqueous solution containing sodium chloride and copper sulphate, heating the so-treated article to a dull red heat, and quenching the heated article.

6. The method of removing scale from cupreous articles which comprises treating the article with a dilute aqueous solution of hydrochloric acid, heating the so-treated article to a dull red heat, and quenching the heated article.

7. The method of removing scale from cupreous articles which comprises treating the article with an aqueous solution containing about 5% of sodium chloride and about 10% of copper sulphate, heating the so-treated article to a dull red heat, and quenching the heated article.

8. The method of removing scale from cupreous articles which comprises treating the article with a dilute aqueous hydrochloric acid solution containing about 5 c. c. of 35% hydrochloric acid to 1 liter of water, heating the so-treated article to a dull red heat, and quenching the heated article.

9. The method of removing scale from cupreous articles which comprises immersing the article for several minutes in an aqueous solution containing chloride ions, then heat-treating the article for about 30 minutes at a temperature of about 1200 to 1250° F., and quenching the heat-treated article.

10. The method of removing scale from hot-rolled copper shapes which comprises immersing the shapes for several minutes in an aqueous solution containing about 5% of sodium chloride and about 10% of copper sulphate, then heat-treating the shapes for about 30 minutes at a temperature of about 1200 to 1250° F., and quenching the heat-treated shapes.

11. The method of removing scale from hot-rolled copper shapes which comprises immersing the shapes in a dilute aqueous solution containing hydrochloric acid then heat-treating the shapes for about 30 minutes at a temperature of about 1200 to 1250° F., and quenching the heat-treated shapes.

12. The method of removing scale from cupreous articles which comprises immersing the article in an aqueous solution containing chloride ions, heating the so-treated article to a dull red heat, and quenching the heated article in an aqueous medium.

13. The method of removing scale from hot-rolled copper rods which comprises treating the rods with an aqueous solution containing chloride ions and ions of a heavy metal, heating the so-treated rods to a dull red heat, and quenching the heated rods.

14. The method of removing scale from hot-rolled copper rods which comprises treating the rods with a dilute aqueous hydrochloric acid solution, heating the so-treated rods to a dull red heat, and quenching the heated rods.

15. The method of removing scale from hot-rolled copper rods which comprises immersing the rods in an aqueous solution containing about 5% of sodium chloride and about 10% of copper sulphate, heating the so-treated rods to a dull red heat, and quenching the heated rods.

16. The method of removing scale from hot-rolled copper rods which comprises immersing the rods in a dilute aqueous hydrochloric acid solution containing about 5 c. c. of 35% hydrochloric acid to 1 liter of water, then heating the so-treated rods to a dull red heat, and quenching the heated rods.

17. The method of removing scale from cupreous articles which comprises immersing the articles in an aqueous slightly ammoniacal solution containing chloride ions, heating the so-treated article to a dull red heat, and quenching the heated article.

18. The method of removing scale from hot-rolled copper rods which comprises immersing the rods in a slightly alkaline solution containing chloride ions, ions of a heavy metal, and a small amount of ammonia, heating the so-treated rods to a dull red heat, and quenching the heated rods.

19. The method of removing scale from cupreous articles which comprises treating the article with an aqueous solution containing chloride ions, the hydrogen ion concentration of said solution being not substantially greater than that corresponding to a solution containing 5 c. c. of 35% hydrochloric acid per liter of water, heating the so-treated article to a dull red heat, and quenching the heated article.

WILLIAM H. BASSETT, Jr.
CLERMONT J. SNYDER.
WILLIS G. MacLELLAND.